United States Patent [19]
Choudhury et al.

[11] Patent Number: 6,092,115
[45] Date of Patent: Jul. 18, 2000

[54] METHOD FOR SUPPORTING PER-CONNECTION QUEUING FOR FEEDBACK-CONTROLLED TRAFFIC

[75] Inventors: Abhijit Kumar Choudhury, Basking Ridge; T. V. Lakshman, Monmouth; Dimitrios Stiliadis, Hoboken; Bernhard Suter, Monmouth, all of N.J.

[73] Assignee: Lucent Technologies Inc., Murray Hill, N.J.

[21] Appl. No.: 08/961,122

[22] Filed: Oct. 30, 1997

Related U.S. Application Data

[60] Provisional application No. 60/037,843, Feb. 7, 1997.

[51] Int. Cl.$^7$ ..................................................... G06F 13/00
[52] U.S. Cl. ............................................................. 709/235
[58] Field of Search ........................ 364/DIG. 1, DIG. 2; 709/200, 213, 214, 215, 217, 218, 219, 234, 233, 235

[56] References Cited

U.S. PATENT DOCUMENTS 5,881,245  3/1999  Thompson ................................ 348/12

FOREIGN PATENT DOCUMENTS 0706298  10/1997  European Pat. Off. .

OTHER PUBLICATIONS

Wakeman, et al Implementing Real Time Packet Forwarding Policies Using Streams, Unisex Technical Conference, Jan. 16–20, 1995 (Nov. 14, 1994), pp. 71–76.

Floyd & Jacobson, "Link–Sharing and Resource Management Models for Packet Networks", IEEE/ACM Transactions on Networking, vol. 3, #4, Aug. 1995, pp. 365–386.

Braden, et al, "Integrated Services in the Internet Architecture an Overview," RFC 1633, Jun. 1994, htt://info.internet.isi.edu/in–notes/rfc/files/rfc1633,txt.

Yang and Reddy, "A Taxonomy for Congestion Control Algorighms in Packet Switching Networks," IEEE Networks: The Magazine of Computer Communication, vol. 9, #4, Jul. 1995, pp. 34–45.

*Primary Examiner*—Robert B. Harrell

[57] ABSTRACT

A per-flow queuing method and apparatus for IP networks carrying traffic from feedback controlled TCP connections enables flow of information packets from one or more sources to a destination through a link and comprises a buffer of predetermined size partitioned into a plurality of queues, each queue being allocated an occupancy $b_i$ for receiving and temporarily storing packets of information; a scheduler for removing packets from each buffer according to a predetermined rate and transmitting the packets over a network; and a control device for determining availablilty of queues in the buffer capable of receiving the packet and inputting the packet into a queue if the queue is available, the control device further selecting a queue and releasing a packet from the selected queue to accommodate input of the received packet when the queue is not available. Increased fairness and packet throughput through the link is achieved when the queue for dropping a packet is selected in accordance with a longest queue first or random drop scheme and, when a drop from front strategy for ACK packets is employed.

20 Claims, 4 Drawing Sheets

METHOD FOR SUPPORTING PER-CONNECTION QUEUING FOR FEEDBACK-CONTROLLED TRAFFIC

RELATED APPLICATIONS

This application claims the benefit of provisional U.S. patent application Ser. No. 60/037,843 filed Feb. 7, 1997.

FIELD OF THE INVENTION

The present invention relates generally to a communications network implementing the TCP protocol, and to per-connection queuing and buffer management schemes for feedback-controlled network traffic.

BACKGROUND OF THE INVENTION

Implementation of the transport protocol "TCP" for performing reliable transport of data packets is well-known. FIG. 1 illustrates a conventional router arrangement in a TCP/IP network, e.g., Internet, whereby a local area network 20 is connected via a router 50 to a wide area network 60. Typically, the architecture of a router 50 is such that a plurality of data streams, e.g. from source data terminals connected as part of LAN 20, are received by a single buffer and are serviced by a server that sends the packets over a link 55. Once data packets arrive at their destination, e.g., a data terminal located at wide area 60, the receiver of the packet will generate an acknowledgment "ACK" packet, implicitly or explicitly, for each data packet received. Transmission of data from the source terminals is controlled by the rate of received acknowledgment packets from prior data transmissions and, as is well-known, the control of data packet transmission from a source is determined by the feedback of ACK packets from the receiver in accordance with two major variants of an adaptive sliding window scheme: TCP-Reno and TCP-Tahoe as described generally in Richard W. Stevens, "TCP/IP Illustrated" Vols. 1–3, Addison Weseley 1994, incorporated by reference as if fully set forth herein.

It has been determined that TCP exhibits inherent unfairness toward connections with long-round trip times, i.e., short round-trip time connections get more bandwidth than longer round-trip time connections because the TCP window grows faster for the short round-trip time connection than the window for the long round-trip time connection. This is because acknowledgments are received faster in the shorter round-trip time connection. An effective solution to alleviate the inherent unfairness problem has not yet been found.

Another problem inherent in TCP is the phenomenon of window synchronization. For instance, given two equal round-trip time connections at the link, the link will become saturated and the buffer will start to build up. At some point there are buffer overflows connected to the link, and those connections will experience packet loss roughly at the same time. Consequently, each connection will cut back its window virtually simultaneously, and the network throughput rate is cut down simultaneously and the network link will be underutilized.

Other problems that degrade TCP-connected network performance include phase effects, physical bandwidth asymmetry for slow reverse paths due to bottleneck link, creation of bursty traffic, lack of isolation, and lack of protection from more aggressive transport protocols or malicious users, etc.

One solution that has been implemented to improve network performance is a Random Early Detection ("RED") scheme which functions to drop packets before the buffer becomes saturated. The buffer is monitored and when the average buffer occupancy goes beyond a particular threshold, packets are randomly dropped, e.g., with a certain probability which is a function of the average buffer occupancy (moving time average), which causes the TCP connections to cut their windows randomly. This is particularly effective to de-synchronize the windows. Specifically, in a FIFO-RED scheme, those connections that use the link more are likely to have more packets dropped and consequently, its corresponding window size cut. This tends to reduce the bias for these higher rate connections.

Another scheme disclosed in co-pending U.S. patent application Ser. No. 08/858,310 entitled "System for Improving Data Throughput of a TCP/IP Network Connection with Slow Return Channel", the contents of which in incorporated by reference as if fully set forth herein, implements a drop from front strategy for ACK packets which has the benefit of increasing fairness and throughput when the reverse path is congested.

For non-TCP open-loop traffic, e.g., so-called "leaky-bucket" constrained type of streams, fair-queuing scheduling schemes have been implemented to maximize performance through a connecting link, with a scheduling scheme implemented such that the bandwidth is shared among each of the input connections in accordance with an equal or different weight. Recently much research attention has been focused on the use of fair queuing schemes as a means for guaranteeing end-to-end delay bounds and isolation. Studies in this context have primarily been for non-feedback-controlled leaky bucket policed traffic and have resulted in the development of switches and routers with weighted fair-queuing schemes. See, for example, A. K. Parekh and R. G. Gallager, "A Generalized Processor Sharing Approach to Flow Control in the Single Node Case", Proc. of INFOCOM '92, pp 915–924, May 1992. D. Stiliadis and A. Varma, "Design and Analysis of Frame-based Queuing: A New Traffic Scheduling Algorithm for Packet-Switched Networks", Proc. of ACM SIGMETRICS '96, pp. 104–115, May 1996. The focus of fair queuing in switches concentrates on the use of schedulers for servicing a variety of buffer configurations, e.g., those with physically or logically separate buffers, a shared buffer, etc.

It would be highly desirable to implement a fair queuing scheme in the context of controlling traffic in and improving performance of feedback-controlled TCP networks.

Moreover, it would be highly desirable to implement a fair queuing scheme implementing a packet dropping mechanism that enables fair throughputs for TCP connections.

SUMMARY OF THE INVENTION

The instant invention is a per-flow/connection, shared-buffer management scheme to be used in conjunction with fair queuing scheduler in a feedback-controlled TCP network, so as to achieve the goals for TCP such as: 1) alleviate the inherent unfairness of TCP towards connections with long round-trip times; 2) provide isolation when connections using different TCP versions share a bottleneck link; 3) provide protection from more aggressive traffic sources, misbehaving users or from other TCP connections in the case of reverse path congestion; 4) alleviate the effects of ACK compression in the presence of two-way traffic; 5) prevent users experiencing ACK loss (which causes their traffic to be bursty) from significantly affecting other connections; 6) provide low latency to interactive connections which share a bottleneck with "greedy" connections without reducing overall link utilization.

More particularly, a shared buffer architecture is implemented with bandwidth reservation guarantees, $r_i$ for each connection. Given a connection that is fully using its buffer of rate $r_1$ and a second connection of rate $r_2$ that is being underutilized (wasted), then if that first connection needs more bandwidth, it may borrow the buffering (bandwidth) from the $r_2$ connection in the shared buffer scheme. When the second connection needs to reclaim its buffer space, then data from another utilized buffer needs to be pushed out to make room for the incoming data packets. The per-connection queue management scheme supports a packet dropping mechanism, such as longest queue first ("LQF"), in shared buffer architecture to result in improved TCP performance than FIFO-RED buffer management schemes. A fairness measure is used by comparing the ratio of the standard deviation to mean of the individual throughputs as a fraction of the total integrated link capacity.

DETAILED DESCRIPTION OF THE INVENTION

Figure 1:
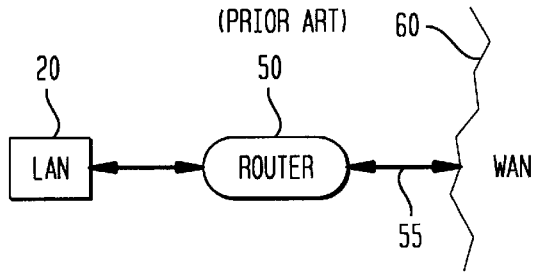
FIG. 1 is a diagram illustrating a TCP network connection.
Figure 2:
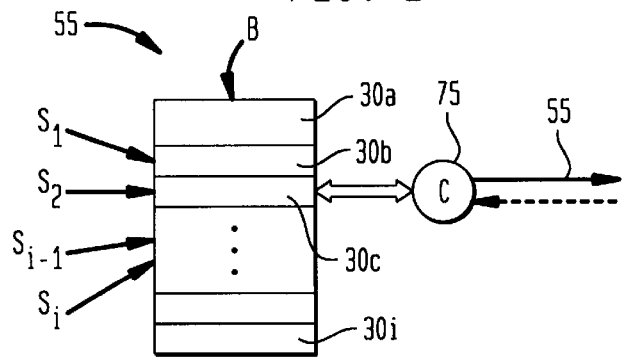
FIG. 2 is a block diagram of a shared buffer architecture for multiple TCP connections.

FIG. 2 illustrates the per-connection queue architecture for the router 55 of a TCP network connection handling packet traffic originating from a variety of sources $s_1, \ldots, s_i$. The network connection element includes a global, shared buffer memory B partitioned to form a plurality of "i" queues $30a, \ldots, i$, for connections with a single (bottleneck) link 55 and scheduler 75 servicing data packets on the link 55 at a rate C. Each buffer connection i has a nominal buffer allocation $b_i$ which is that connection i's guaranteed buffer size. In this architecture known as "per-flow queuing" or "per-connection queuing", fine grained dynamic classification of the arriving packets to be queued is required. A "soft state" approach is assumed to maintain the connection state which leads to a potentially very high number of presumably active connections where the large majority may actually not be active any more and the associated state in the network node is just waiting to be timed out, reclaimed or deleted by any other means of garbage collection. Therefore scalability and sharing are primary requirements for a per-connection server. All operations required are implementable with O(1) complexity and no resources (buffer or bandwidth) is statically allocated to a given connection.

In operation, the scheduler 75 services each individual queue i at a rate equal to $r_i$, which may be equal for each queue or, in accordance with a predetermined weight. A particular queue (connection) that uses more bandwidth, e.g., queue 30a at rate $r_1$, is likely to have a longer queue than the other queues. If all the queue connections are fully utilizing their respective bandwidth allocations, then queue 30a will most likely experience buffer overflow. If some of the allocated memory, e.g., queue 30c, is not fully utilized, then the fair-queuing scheme of the invention enables data packets arriving at queue 30b to utilize or borrow buffer space from the underutilized queue 30c, on an as-needed basis, and thus exceed the reserved allocation $b_i$ of buffer queue 30a. If the second buffer receiving packets meant for the first high rate buffer queue 30a becomes full, then another underutilized buffer, e.g., queue 30i may lend buffer space for new data packets destined for queue 30a.

It should be understood that more than one queue at a time may experience buffer overflow and hence, may borrow from an underutilized buffer space. Thus, more than one queue may exceed its reserved allocation $b_i$. It should also be understood that the invention as described is applicable in both the forward and reverse connections of the TCP connected network and is equally applicable to both data and ACK traffic flow.

When a connection i needs more than $b_i$ buffers, it is allocated space from the available pool, provided of course that the total occupancy is less than B.

Figure 3A:
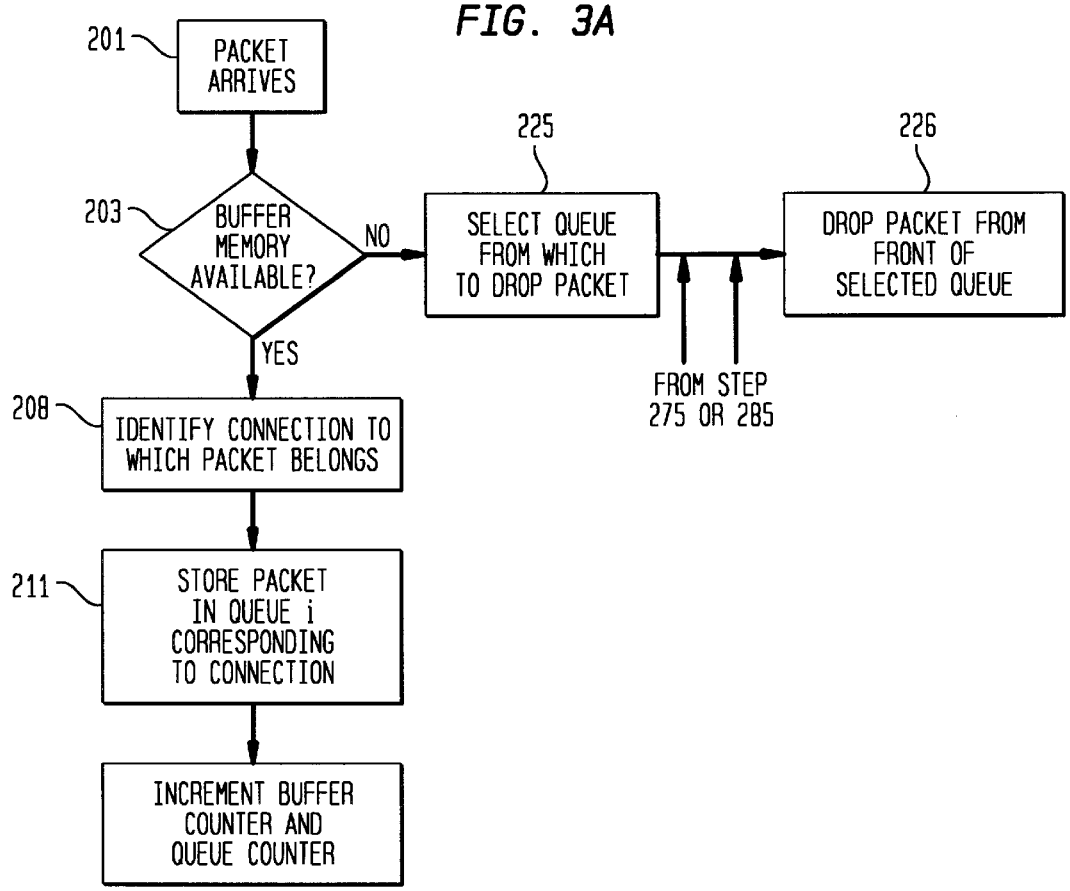
FIGS. 3(a), 3(b), and 3(c) illustrate the methodology implemented for effecting buffer allocation and packet dropping schemes with FIG. 3(b) illustrating the LQF packet drop method and FIG. 3(c) illustrating the RND packet drop method.

FIG. 3(a) illustrates the general flow diagram for implementing the per connection queue scheme of the invention. When a packet arrives that is destined for a connection i, as shown at step 201, the first step 202 is to check a counter containing the current remaining available space of the buffer B and determine whether there is enough remaining memory space in the buffer to ensure accommodation of the newly arrived packet. If there is enough remaining memory space in the buffer to ensure accommodation of the newly arrived packet, then the process continues at step 208 to identify the connection i that the arrived packet belongs to and, at step 211, to store that packet in the queue corresponding to the connection. It should be understood that implicit in this scheme is that the arriving packet(s) have been properly classified and assigned to one of the queues.

Figure 3B:
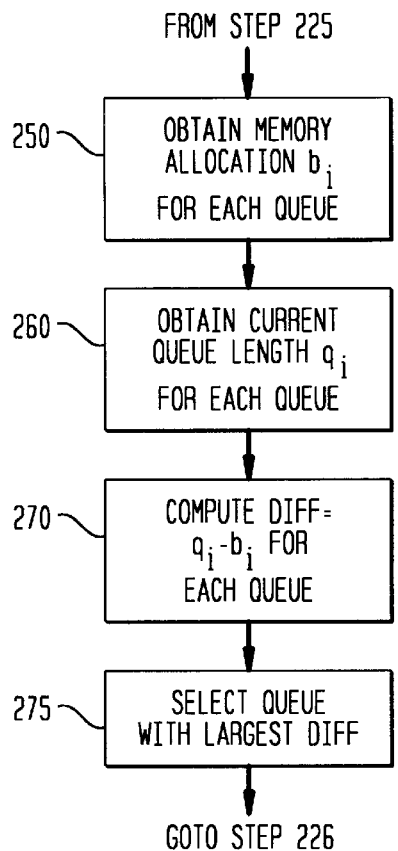

If it is determined at step 203 that there is not enough remaining memory space in the buffer to ensure accommodation of the newly arrived packet, e.g., queue 30j whose current occupancy $q_j$ is less than $b_j$ needs a buffer, then a pushout scheme is implemented at step 225 to make room for the arriving packet(s). Specifically, depending upon the implementation of the TCP protocol invoked, two methods can be employed for choosing the queue from which the pushout is done:

Specifically, as shown in FIG. 3(b), the pushout mechanism in a first embodiment is an LQF scheme that selects the queue that is borrowing the greatest amount of memory reserved from another queue, i.e., the connection i such that ($q_i-b_i$) is the largest over all connections. Thus, as shown at step 250, a determination is made as to the current buffer allocation of each queue in the buffer. Then, at step 260, the current queue length $q_i$ of each queue is obtained and at step 270 a computation is made as to the difference $q_i-b_i$ for each queue. Finally, at step 275, the queue having the largest difference $q_i-b_i$ is selected. Thus, the most deviation from its reserved allocation $b_i$ is the longest queue and hence, a packet will be dropped from that queue first in one to one correspondence with arriving packet as indicated at step 226 FIG. 3(a).

It should be understood that skilled artisans may devise other algorithms for effecting longest queue first pushout scheme discussed herein, and that the invention is not restricted to the methodology depicted in FIG. 3(b). For instance, a longest delay first ("LDF") dropping mechanism can be implemented which is equal to the LQF scheme when the allocated service rates $r_i$ are all equal because if queues are being served at the same rate the delay will be the same for each connection. Analogously, if the service rates are unequal, the delays would be different even if the queue lengths are the same. Thus, the LQF scheme is a special instance of the LDF.

It is possible that the Longest Queue First scheme may lead to excessive bursty losses when implemented in a system with many connections having one queue considerably longer than the second longest queue, i.e., two or more closely spaced packets are dropped consecutively from the queue exceeding its allocation. For instance, performance of the connection implementing a TCP-Reno architecture will be adversely affected as TCP-Reno type implementations are known to behave badly in presence of bursty loss. Thus, in order to reduce the amount of bursty loss in the above LQF scheme is modified to employ a random generator that randomly picks from those buffers exceeding their respective allotments.

Figure 3C:
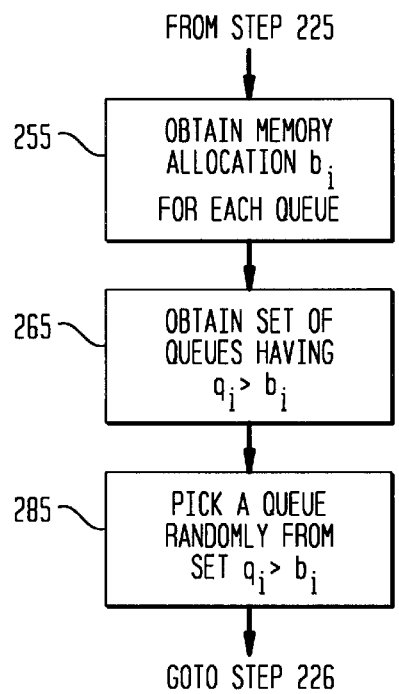

Specifically, in a second embodiment, each backlogged connection i has a nominal buffer allocation of $b_i=B/n$; where n is the number of backlogged connections. As illustrated in FIG. 3(c), step 255, the memory allocation $b_i$ for each queue is obtained. Then, at step 265, the backlogged connections are grouped, e.g., into two subsets: those with occupancy $q_i$ greater than $b_i$, and those with $q_i \leq b_i$. From the set of queues above their allocation, i.e., $q_i > b_i$, one is selected randomly as indicated at step 285 and a packet is dropped from the front as indicated at step 226.

In an attempt to equalize buffer occupancy for different connections and to provide optimal protection from connections overloading the system, the selected pushout scheme will drop packets from the front of the longest queue in a manner similar to schemes implemented for open-loop traffic such as described in L. Georgiadis, I. Cidon, R. Guerin, and A. Khamisy, "Optimal Buffer Sharing," *IEEE J Select. Areas Commun.*, vol. 13, pp. 1229–1240, September 1995.

Figure 4:
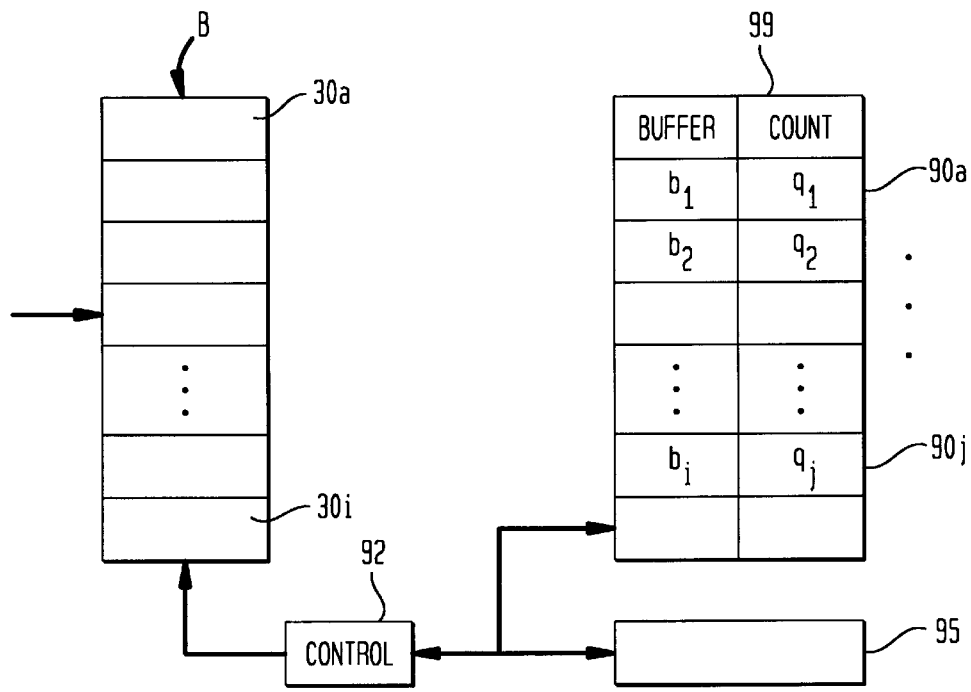
FIG. 4 is a diagram illustrating the hardware associated with each buffer queue.

As shown in FIG. 4, from the hardware standpoint, counters 90a, . . . , 90i are shown associated with each queue 30a, . . . , 30i with a control processor 92 programmed to keep track of the occupancy $q_i$ of its respective associated queue. Thus, in method steps 260 and 265 in FIGS. 3(b) and 3(c), respectively, the current queue lengths are obtained, e.g., by polling, or, e.g., by locating from a table of registers such as table 99 in FIG. 4, the register indicating the longest queue length. Another counter 95 is shown to keep track of the total buffer occupancy B. Thus, when a packet arrives, the processor 92 provides a check at step 203 (FIG. 3(a)), to determine the total memory available in the counter 95.

To determine the longest queue, processor 92 may implement a sorted structure such that, at the time of each enqueue, dequeue, or drop operation, after the queue's corresponding counter has been accordingly incremented or decremented, its queue occupancy value $q_i$ is compared to the current longest queue occupancy value so that the longest queue structure is always known.

A variation of these per-flow schemes can be efficiently implemented by using a set of bins with exponentially increasing size. Whenever a queue is modified (enqueue, dequeue or drop), it is moved to the appropriate bin (which is either the same, one above or below the current bin), while the system is keeping track of the highest occupied bin.

When the buffer is full any queue from the highest occupied bin is selected and its first packet dropped. If the buffer is measured in bytes, this operation may have to be repeated until enough space has been freed to accommodate the newly arrived packet due to variable packet sizes. To achieve true LQD, the queues in the highest occupied bin would either have to be maintained as a sorted list or searched for the longest queue every time.

Figure 5:
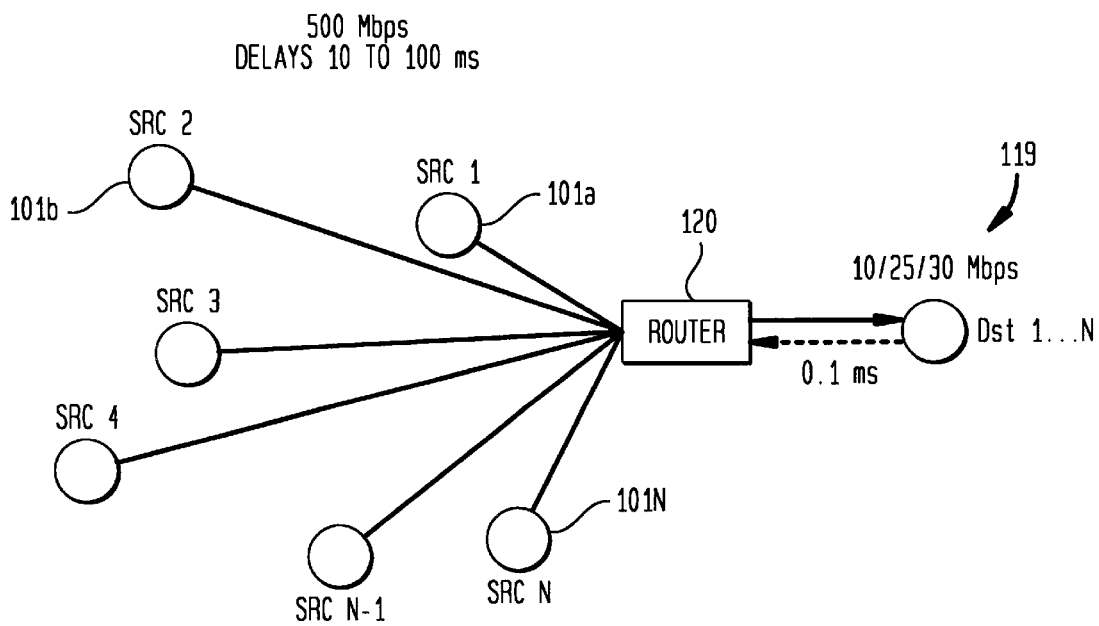
FIG. 5 illustrates the simulation of a TCP/IP network having a router implementing fair queuing.

A simulation of the improved performance of the buffer management schemes of the invention compared to the FIFO-RED and FQ-RED schemes is now described. The simulation system 119 is illustrated as shown in FIG. 5 with sources 101a, . . . , 101f having high-speed access paths to a router 120 implementing the per-connection flow buffer management scheme of the invention which is the sole bottleneck. The comparisons were done using a mix of TCP Tahoe and TCP Reno sources, bursty and greedy sources, one-way and two-way traffic sources with reverse path congestion, and widely differing round trip times. The access path delays are set over a wide range to model different round trip times and the destinations were assumed to ACK every packet. For one way traffic, ACKs are sent over a non-congested path. For two-way traffic, the return path is through the router and there may be queuing delays. In particular, when the router uses FIFO scheduling, ACKs and data packets are mixed in the queues. With fair queuing, ACKs are handled as separate flows. For asymmetric traffic, the bandwidth of the return link is reduced from the destination to the router so that there is considerable reverse path congestion and ACK loss.

The implementations of TCP Tahoe and TCP Reno in the simulation system 119 are modeling the TCP flow and congestion control behavior of 4.3-Tahoe BSD and 4.3-Reno BSD, respectively. The RED model is packet oriented and uses 25% of the buffer size as the minimum threshold and 75% as maximum threshold, queue weight being 0.002.

Figure 6A:
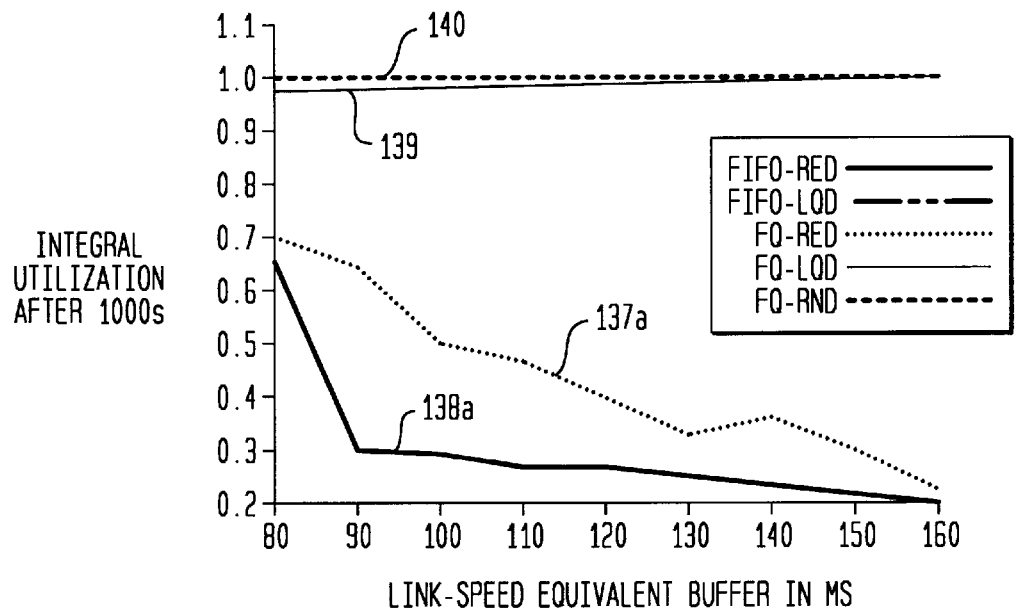
FIG. 6(a) illustrates the improved TCP performance measured by throughput (FIG. 6(a)) and fairness coefficient (FIG. 6(b)) as a function of buffer size for 20 TCP connections over a bottleneck link in the simulated network of FIG. 5.
Figure 6B:
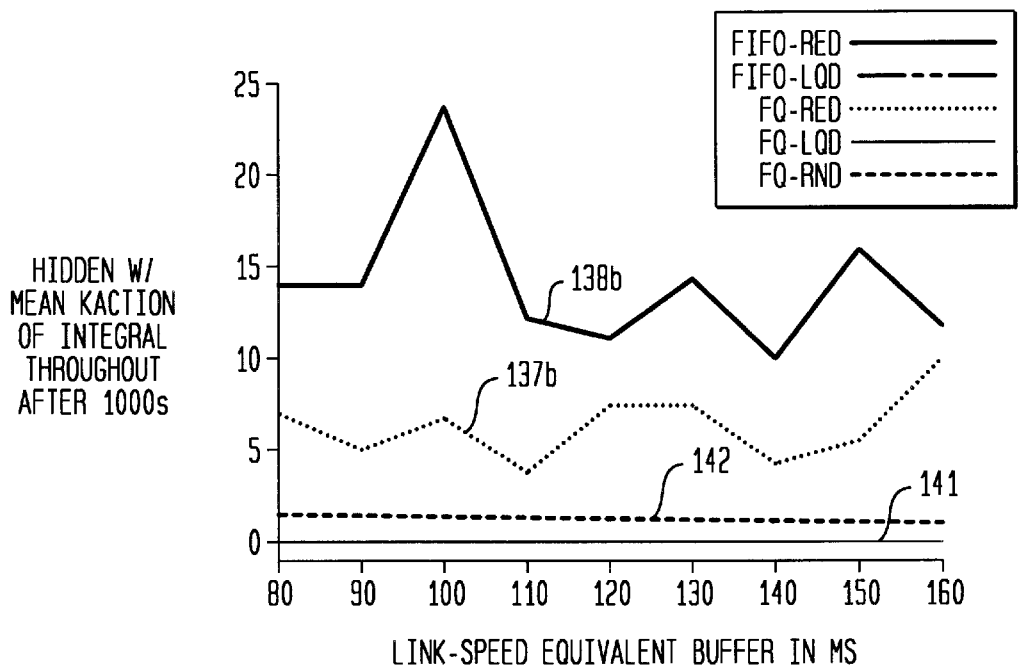

FIGS. 6(a) and 6(b) illustrate the improved performance when fair-queuing -LQD and RND drop methods are implemented in the simulated TCP network from the point of view of utilization and fairness, respectively as compared with prior art FIFO-RED and LQF methods. Particularly, FIG. 6(a) illustrates the improved TCP performance measured of throughput (FIG. 6(a)) and fairness coefficient (FIG. 6(b)) as a function of buffer size for 20 TCP connections over an asymmetric bottleneck link with 10 Mbps/100 Kbps capacity (TCP Tahoe and Reno 20 ms–160 ms round trip time) in the simulated network of FIG. 5.

As can be seen, both FQ- and FIFO-RED policies, indicated by lines 137a and 138a respectively, have poorer throughput than the fair-queuing LQF and RND drop methods indicated by line 139 and 140 because the ACKs corresponding to retransmitted packets are lost 66% of the time for the simulated asymmetry value asymmetry value of three (note that this is not the bandwidth asymmetry). This results in a timeout in at least 66% of TCP cycles greatly reducing throughput. Other timeouts happen because of multiple losses in the forward path and losses of retransmitted packets in the forward path. On the other hand, drop from front in the reverse path eliminates these timeouts almost completely. Since timeouts are expensive, both RED schemes have poorer throughput than the other schemes including FIFO-LQD.

Additionally, as shown in FIG. 6(b), it is shown that both FQ-RND and FQ-LQD work very well because they combine the advantages of per-flow queuing with the time-out elimination of drop-from-front. FQ-LQD has the further advantage in that it has a built-in bias against dropping retransmitted packets. This is because when the source detects a loss by receipt of the first duplicate ACK it stops sending packets. The retransmitted packet is sent only after the third duplicate ACK is received. During the intervening interval when the source is forced by TCP to be silent, the queue corresponding to the flow is drained at least at its minimum guaranteed rate and therefore it is less likely to be the longest queue when the retransmitted packet arrives. Hence, the inherent bias against dropping retransmitted packets. Though this bias is not limited to asymmetric networks, the bias is enhanced in asymmetric networks due to the slow reverse channel dilating, by the asymmetry factor, the interval between receipt of the first and third duplicate ACKS. Since loss of retransmitted packets causes an expensive time-out, this bias improves the performance of FQ-LQD as indicated in FIG. 6(b) as line 141. FQ-RND indicated as line 142 has this bias as well though to a lesser degree. The reasoning is somewhat similar to that for FQ-LQD: during the interval between receipt of the first and third duplicate ACKs the flow's queue drains at a rate equal to at least its guaranteed rate (since the source is silent) and the queue occupancy could fall below the reservation parameter for that flow. In that case, when the retransmitted packet arrives the retransmitted packet is not lost even if the aggregate buffer is full. With these advantages, FQ-LQD and FQ-RND have the best performance.

The foregoing merely illustrates the principles of the present invention. Those skilled in the art will be able to devise various modifications, which although not explicitly described or shown herein, embody the principles of the invention and are thus within its spirit and scope.

What is claimed is:

1. A method of improving performance of TCP connections including the steps of:

partitioning a buffer of predetermined size into a plurality of queues, each queue being allocated an occupancy $b_i$ for receiving and temporarily storing packets of information and being serviced by a scheduler for removing packets from each buffer and transmitting said packets over a said TCP connection; and, upon arrival of a packet, determining availablilty of queues for receiving said packet and inputting said packet into a queue if a said queue is available; and, if said queue is not available, selecting a queue and releasing a packet from said selected queue to accommodate input of said packet, wherein utilization of said connection is improved.

2. A method of improving performance of TCP connections as claimed in claim 1, further including the step of tracking the current length $q_i$ of each queue at a packet arrival or departure event.

3. A method of improving performance of TCP connections as claimed in claim 2, wherein when a said buffer queue is completely filled, the step of temporarily borrowing buffer space from one or more queues that are not completely filled when a packet arrives that is destined for said filled queue, said current length of said filled queue exceeding its normal occupancy $b_i$.

4. A method of improving performance of TCP connections as claimed in claim 3, wherein said step of determining availability of queues includes the step of determining whether said buffer of predetermined size is completely filled.

5. A method of improving performance of TCP connections as claimed in claim 2, wherein the tracking step includes the step of incrementing a counter associated with a said queue each time a packet is input to said queue or decrementing said counter when a packet is released from said queue.

6. A method of improving performance of TCP connections as claimed in claim 2, wherein said packet to be released from said selected queue is the oldest packet resident in said queue.

7. A method of improving performance of TCP connections as claimed in claim 2, wherein said step of selecting a queue includes:

establishing current allocation $b_i$ for each queue;

obtaining current queue length values $q_i$ of each said queue;

computing difference between current queue length values $q_i$ and allocated buffer occupancy $b_i$ for each queue; and, selecting said queue having the largest computed difference value.

8. A method of improving performance of a TCP network connection as claimed in claim 2, wherein said step of selecting a queue includes:

establishing current allocation $b_i$ for each queue;

computing a set of one or more queues for which current queue length values $q_i$ exceed allocated buffer occupancy $b_i$ for each queue; and selecting a queue randomly from said set.

9. A method of improving performance of TCP connections as claimed in claim 2, wherein said scheduler removes packets from each buffer in accordance with different predetermined rates, said step of selecting a queue including:

computing a queuing delay experienced by packets stored in each queue from its respective queue length $q_i$ and its predetermined service rate; and selecting a queue experiencing the longest queuing delay.

10. A method of improving performance of TCP connections as claimed in claim 2, wherein said selecting step further includes the step of:

establishing one or more bins with each bin associated with one or more queues of predetermining lengths; and randomly picking a queue from a bin associated with one or more queues having the longest lengths.

11. A method of improving performance of TCP connections as claimed in claim 1, wherein said scheduler is capable of removing packets from each said buffer at a predetermined rate.

12. A router for communicating packets of information from a plurality of sources to a single communication link in a TCP/IP network, said router comprising:

a buffer of predetermined size partitioned into a plurality of queues, each queue being allocated an occupancy $b_i$ for receiving and temporarily storing packets of information;

a scheduler for removing packets from each buffer and transmitting said packets over said connection;

control means for determining availablilty of queues in said buffer for inputting a received packet into a queue if a said queue of said buffer is available, and further selecting a queue and enabling said scheduler to release a packet from said selected queue to accommodate input of said received packet when a said queue of said buffer is not available.

13. A router as claimed in claim 12, further comprising means associated with each said queue for tracking current length $q_i$ of said queue each time a packet is input to or released from said queue.

14. A router as claimed in claim 13, wherein said tracking means includes a counter device associated with a said queue that is incremented each time a packet is input to said queue or decremented when a packet is released from said queue.

15. A router as claimed in claim 13, wherein said control means includes:
   means for obtaining current queue length values $q_i$ of each said queue; and
   means for computing difference between current queue length values $q_i$ and allocated buffer occupancy $b_i$ for each queue, wherein said queue having the largest computed difference value is selected.

16. A router as claimed in claim 13, wherein said control means further comprises:
   means for computing a set of one or more queues for which current queue length values $q_i$ exceed allocated buffer occupancy $b_i$ for each queue; and
   means for randomly selecting a queue from said set.

17. A router as claimed in claim 13, wherein said scheduler removes packets from each buffer in accordance with different predetermined rates, said control means further comprising:
   means for computing a queuing delay experienced by packets stored in each queue from its respective queue length $q_i$ and its predetermined service rate; and
   means for selecting a queue experiencing the longest queuing delay.

18. A router as claimed in claim 12, wherein said packet to be released from said selected queue is the oldest packet resident in said queue.

19. A per-flow queuing apparatus for IP networks carrying traffic from feedback controlled TCP connections enabling flow of information packets from one or more sources to a destination through a link, said apparatus comprising:

a buffer of predetermined size partitioned into a plurality of queues, each queue being allocated an occupancy $b_i$ for receiving and temporarily storing packets of information;

a scheduler for removing packets from each buffer according to a predetermined rate and transmitting said packets over said network; and control device for determining availablilty of queues in said buffer capable of receiving said received packet and inputting said packet into a queue if a said queue is available, said control device further selecting a queue in accordance with a longest queue first scheme and dropping a packet from said selected queue to accommodate input of said received packet when a said queue is not available, whereby increased fairness and packet throughput through said link is achieved.

20. A per-flow queuing method for IP networks carrying traffic from feedback controlled TCP connections enabling flow of information packets from one or more sources to a destination through a link, said method comprising:

providing a buffer of predetermined size partitioned into a plurality of queues, each queue being allocated an occupancy $b_i$ for receiving and temporarily storing packets of information;

providing a scheduler for removing packets from each buffer according to a predetermined rate and transmitting said packets over said network; and determining availablilty of queues in said buffer capable of receiving said received packet and inputting said packet into a queue if a said queue is available, said control device further selecting a queue in accordance with a random drop scheme and dropping a packet from said selected queue to accommodate input of said received packet when a said queue is not available, whereby increased fairness and packet throughput through said link is achieved.

* * * * *